United States Patent
Mumford et al.

(10) Patent No.: US 9,556,805 B2
(45) Date of Patent: Jan. 31, 2017

(54) CONTROL SYSTEM AND METHOD FOR ISOLATING HIGH PRESSURE PILOT FUEL IN DUAL-FUEL HPDI SYSTEM

(71) Applicant: Caterpillar Inc., Peoria, IL (US)

(72) Inventors: David Kalu Mumford, Vancouver (CA); Josh Steffen, El Paso, IL (US); Derek Puzzuoli, Vancouver (CA)

(73) Assignee: Caterpillar Inc., Peoria, IL (US)

( * ) Notice: Subject to any disclaimer, the term of this patent is extended or adjusted under 35 U.S.C. 154(b) by 158 days.

(21) Appl. No.: 14/625,125

(22) Filed: Feb. 18, 2015

(65) Prior Publication Data

US 2016/0237921 A1    Aug. 18, 2016

(51) Int. Cl.
  *F02D 19/06*    (2006.01)
  *F02M 43/02*    (2006.01)

(52) U.S. Cl.
  CPC ....... *F02D 19/0605* (2013.01); *F02D 19/0673* (2013.01); *F02M 43/02* (2013.01)

(58) Field of Classification Search
  CPC .... Y02T 10/36; F02D 41/0025; F02D 19/081; F02D 41/0027; F02D 19/0647; F02D 19/0689; F02D 19/0692; F02D 19/084; F02D 19/0665; F02D 19/0671; F02D 19/061; F02D 19/0628; F02D 19/0655; F02D 19/0694; F02D 19/08; F02D 19/0644
  USPC .................................. 123/575, 576, 577, 578
  See application file for complete search history.

(56) References Cited

U.S. PATENT DOCUMENTS

| | | | |
|---|---|---|---|
| 6,298,833 B1 | 10/2001 | Douville et al. | |
| 6,543,395 B2 | 4/2003 | Green | |
| 7,019,626 B1 | 3/2006 | Funk | |
| 7,308,889 B2 | 12/2007 | Post et al. | |
| 7,627,416 B2 | 12/2009 | Batenburg et al. | |
| 8,412,439 B2 | 4/2013 | Warner et al. | |
| 2002/0185086 A1* | 12/2002 | Newman | F02D 19/0647 123/1 A |
| 2012/0145126 A1* | 6/2012 | Krug | F02D 19/0628 123/447 |
| 2012/0285417 A1* | 11/2012 | Kim | F02D 19/0684 123/299 |

(Continued)

FOREIGN PATENT DOCUMENTS

CA         2849623 A1    7/2014

*Primary Examiner* — Sizo Vilakazi
(74) *Attorney, Agent, or Firm* — Miller, Matthias & Hull LLP

(57) ABSTRACT

An improved fuel system for a dual-fuel internal combustion engine. During normal operation, the primary fuel passes through a pressure regulator before arriving at a primary fuel rail. Further, pressurized secondary fuel is delivered to both a secondary fuel rail and to the pressure regulator for purposes of regulating the output pressure of the primary fuel that is delivered to the primary fuel rail. When the pressure at the primary fuel supply or between the primary fuel supply and the pressure regulator drops below a minimum operating pressure, the pressure regulator is isolated from the secondary fuel and the secondary fuel continues to be pressurized until it reaches a suitable pressure for operating in a limp mode. Then, the secondary fuel, which is pressurized to greater than a normal operating pressure, may be injected at the higher pressure for improved performance of the engine in the limp mode.

20 Claims, 3 Drawing Sheets

(56) References Cited

U.S. PATENT DOCUMENTS

| | | | |
|---|---|---|---|
| 2013/0037622 A1* | 2/2013 | Kim | F02M 43/04 239/5 |
| 2013/0220274 A1 | 8/2013 | Deshpande et al. | |
| 2014/0020773 A1* | 1/2014 | Sommars | F02M 43/04 137/511 |
| 2014/0116520 A1* | 5/2014 | Puckett | F02D 19/0647 137/2 |
| 2014/0116523 A1* | 5/2014 | Puckett | F02D 19/0673 137/12 |
| 2014/0222317 A1 | 8/2014 | Norton | |
| 2014/0238353 A1* | 8/2014 | Brown | F02M 51/06 123/458 |

* cited by examiner

CONTROL SYSTEM AND METHOD FOR ISOLATING HIGH PRESSURE PILOT FUEL IN DUAL-FUEL HPDI SYSTEM

BACKGROUND

This disclosure relates to high-pressure direct-injection (HPDI) fuel systems designed to inject a primary fuel, such as natural gas, and a pilot fuel, such as diesel, into a combustion chamber, for example a cylinder of a reciprocating internal combustion (IC) engine. More specifically, this disclosure describes an HPDI system that features a "limp mode" when the supply of natural gas is depleted or otherwise interrupted. Still more specifically, this disclosure describes a control system and method for generating and isolating high-pressure pilot fuel in an HPDI system when operating in a limp mode.

Heavy-duty IC engines that run on natural gas instead of diesel are desirable because natural gas has cost advantages and produces fewer emission products compared to diesel. Engines that burn natural gas may be spark-ignited or compression-ignited. Spark-ignited engines are available, but spark-ignited engines that run on natural gas have reduced efficiencies and lower torques at low speeds when compared with traditional diesel engines. However, spark-ignited engines that run on natural gas are commonly used for transit buses, delivery vehicles, shuttles, street sweepers and other applications that do not require high torque and low speeds.

Compression-ignited engines that burn natural gas also burn some diesel as a pilot fuel and are therefore referred to as dual-fuel engines. Fuel systems for dual-fuel compression-ignited engines come in two types: substitution systems and high-pressure direct injection (HPDI) systems. Substitution systems simply add natural gas to the intake air stream and decrease the amount of diesel fuel, thereby "substituting" a percentage of the diesel with natural gas. Drawbacks of substitution systems include reduced power output because introducing natural gas into the intake air system reduces the amount of air drawn into the engine, and the amount of natural gas that can be substituted is limited by engine knock limits to avoid premature detonation of a premixed charge of natural gas and air. Engines equipped with substitution systems will run either on natural gas and substantial amounts of diesel or pure diesel (with no natural gas), but will not run primarily on natural gas. The substitution percentage of diesel with natural gas typically ranges between 0 and 65%, dependent upon the load and operating conditions. While substitution systems account for the majority of diesel/natural gas engines in use today, the inability to run on natural gas without substantial amounts of diesel renders substitution systems less environmentally friendly than HPDI systems. Further, substitution systems do not provide the fuel cost savings provided by HPDI systems when natural gas is less expensive than diesel fuel.

HPDI systems burn primarily natural gas with a small amount of diesel as a pilot fuel. The diesel is injected into the cylinder just prior to the injection of high-pressure natural gas to provide the ignition. Typically, the diesel amounts to less than 10% of the combusted fuel and therefore the emission reduction is substantial. Engines equipped with HPDI fuel systems offer power, torque and efficiency similar to that of traditional diesel engines. Further, a traditional diesel engine may be converted to an HPDI engine by replacing the diesel fuel system with an HPDI fuel system.

Current HPDI systems may run on diesel only, for those situations where the natural gas supply is depleted or natural gas is otherwise not available, or for extremely cold starts when the engine is too cold to effectively vaporize the natural gas stored in liquefied form, as disclosed in CA 2849623. During normal operations, when diesel is used as a pilot fuel, the diesel and natural gas are pressurized to a normal system pressure of about 30 MPa. However, when the engine is operating in a limp mode (also known as a limp-home mode, run-on diesel (ROD) mode and diesel only mode (DOM)), injecting diesel at the normal operating pressure provides only about 10% of the engine power. Operating at such a reduced power is very disadvantageous for some applications, such as mine haul trucks, where substantial power may be needed to move a truck off the haul road. Further, trucks with HPDI systems may need to travel substantial distances or climb steep inclines to reach a site where the natural gas supply can be replenished.

A solution to this problem would be to increase the pressure of the diesel from the normal operating pressure of about 30 MPa to a higher pressure of about 100 MPa while operating in the limp mode, but certain components of an HPDI system, such as the pressure regulator, cannot withstand the excessive force imbalance between the normal operating pressure and the high pressure needed to run on diesel only. Thus, a need exists for an HPDI fuel system and method that delivers high-pressure diesel (or high-pressure secondary fuel) to the engine when the engine is operating in a limp mode without compromising components needed to operate the engine in a normal operating mode.

SUMMARY OF THE DISCLOSURE

In one aspect, a fuel system for an internal combustion engine includes a primary fuel supply and a secondary fuel supply. The primary fuel supply may be in communication with a primary chamber of a pressure regulator. The primary chamber of the pressure regulator may be in communication with a primary fuel rail. The primary fuel supply may also be in communication with a primary pressure sensor. The primary pressure sensor may be linked to a controller. The secondary fuel supply may be in communication with a secondary fuel pump. The secondary fuel pump may be in communication with a secondary fuel isolation valve and a secondary fuel rail. The secondary fuel pump may be linked to the controller and may be in communication with a secondary pressure sensor disposed downstream of the secondary fuel pump. The secondary fuel isolation valve may be in selective communication with a secondary chamber of the pressure regulator. The secondary fuel isolation valve may be linked to the controller. The secondary fuel isolation valve has a normal operating position where the secondary fuel pump is in communication with the secondary chamber through the secondary fuel isolation valve. The secondary fuel isolation valve also has a limp mode position where the secondary fuel isolation valve isolates the secondary fuel pump from the secondary chamber. The controller may be configured to command the secondary fuel pump to deliver secondary fuel to the secondary fuel isolation valve and the secondary fuel rail at a first pressure and to shift the secondary fuel isolation valve to its normal operating position when the primary pressure sensor detects that a pressure of the primary fuel supply is above a predetermined minimum operating pressure. The controller may also be configured to command the secondary fuel pump to deliver secondary fuel to the secondary fuel rail at a second pressure and to shift the secondary fuel isolation valve to its limp mode position when the primary pressure sensor detects that the pressure of the primary fuel supply is below the predetermined minimum operating pressure. Further, the second pressure may be greater than the first pressure.

In another aspect, a high-pressure direct-injection (HPDI) fuel system includes a primary fuel supply and a secondary fuel supply. The primary fuel supply may be in communication with a primary chamber of a pressure regulator. The primary chamber of the pressure regulator may be in communication with a primary fuel rail. The primary fuel supply may be in communication with a primary pressure sensor. The primary sensor pressure may be linked to a controller. The secondary fuel supply may be in communication with a secondary fuel pump. The secondary fuel pump may be in communication with a secondary fuel isolation valve and a secondary fuel rail. The secondary fuel isolation valve may be in selective communication with a secondary chamber of the pressure regulator. The secondary chamber may be isolated from the primary chamber and the pressure regulator includes a control member that may be moveable in response to changes in pressure in the secondary chamber. The secondary fuel isolation valve and the secondary fuel pump are linked to the controller. The controller may be configured to maintain the secondary fuel isolation valve in a normal operating position where the secondary fuel isolation valve provides communication between the secondary fuel pump and the secondary chamber when the pressure of the primary fuel supply is above a predetermined minimum operating pressure. Further, the controller may be further configured to command the secondary fuel pump to deliver secondary fuel to the secondary fuel isolation valve and the secondary fuel rail at a first pressure when the pressure of the primary fuel supply is above the predetermined minimum operating pressure. However, the controller may be configured to maintain the secondary fuel isolation valve in a limp mode position with the secondary fuel isolation valve isolating the secondary fuel pump from the secondary chamber and the controller may be further configured to command the secondary fuel pump to deliver secondary fuel to the secondary fuel rail at a second pressure that exceeds the first pressure when the pressure of the primary fuel supply falls below the predetermined minimum operating pressure.

In yet another aspect, a method for isolating high-pressure diesel in a high-pressure direct-injection (HPDI) fuel system includes providing a natural gas supply and providing a diesel supply that is connected to a pump. The method further includes sensing a pressure of the natural gas supply and, if the pressure of the natural gas supply is above a predetermined minimum operating pressure, the method includes providing communication between the natural gas supply and a first chamber of a pressure regulator. The method further includes operating the pump to output diesel at a desired normal operating pressure and providing communication between the pump and a secondary chamber of the pressure regulator. Further, if the pressure of the natural gas supply is below the predetermined minimum operating pressure, the method includes operating the pump to output diesel at a desired limp mode pressure that is greater than the normal operating pressure and isolating the pump from the secondary chamber of the pressure regulator.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood, of course, that this disclosure is not limited to the particular embodiments illustrated herein.

DETAILED DESCRIPTION

Figure 1:
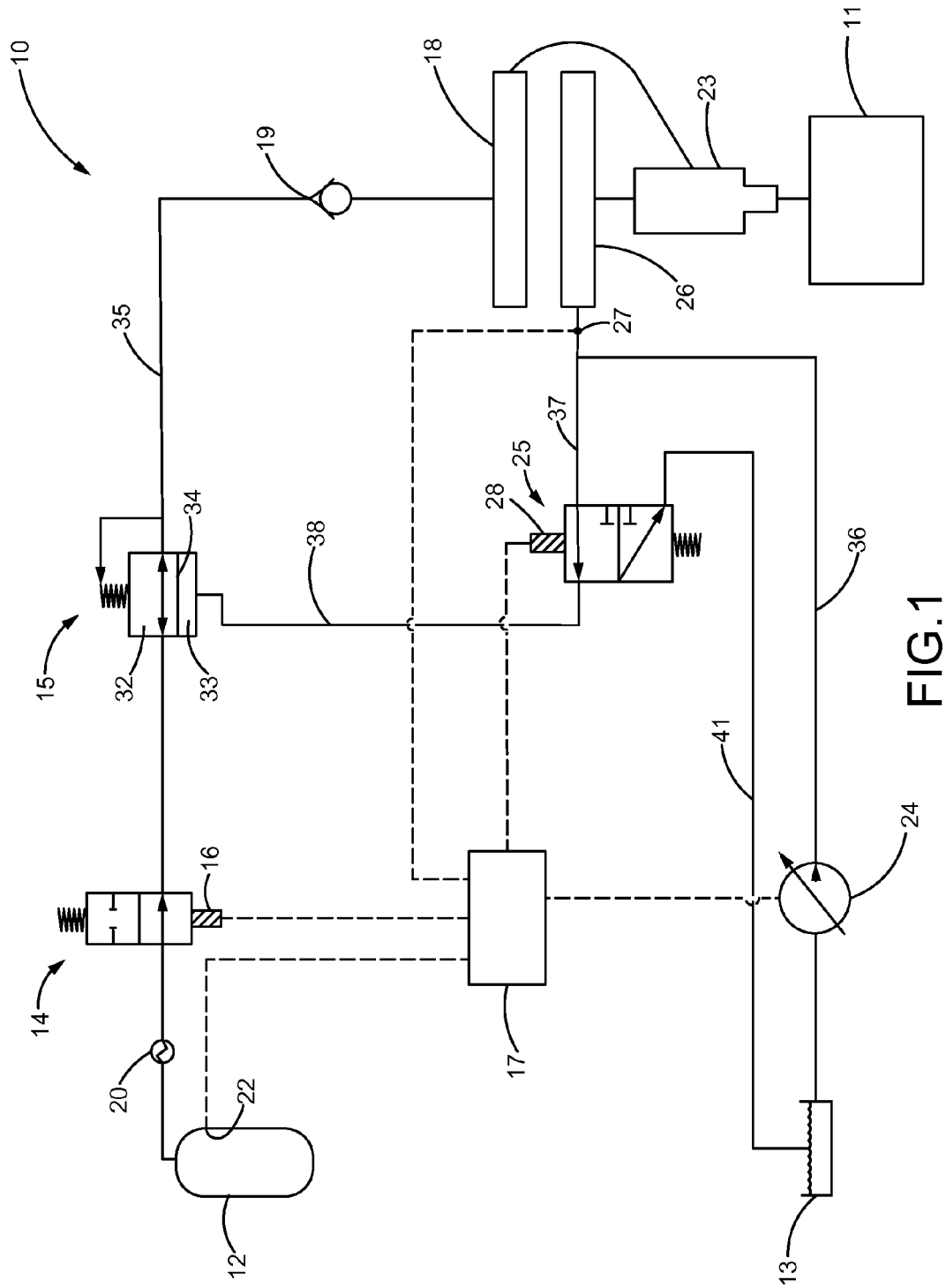
FIG. 1 is a schematic illustration of a fuel system for an internal combustion engine, wherein the system is configured to operate in a normal operating mode.
Figure 2:
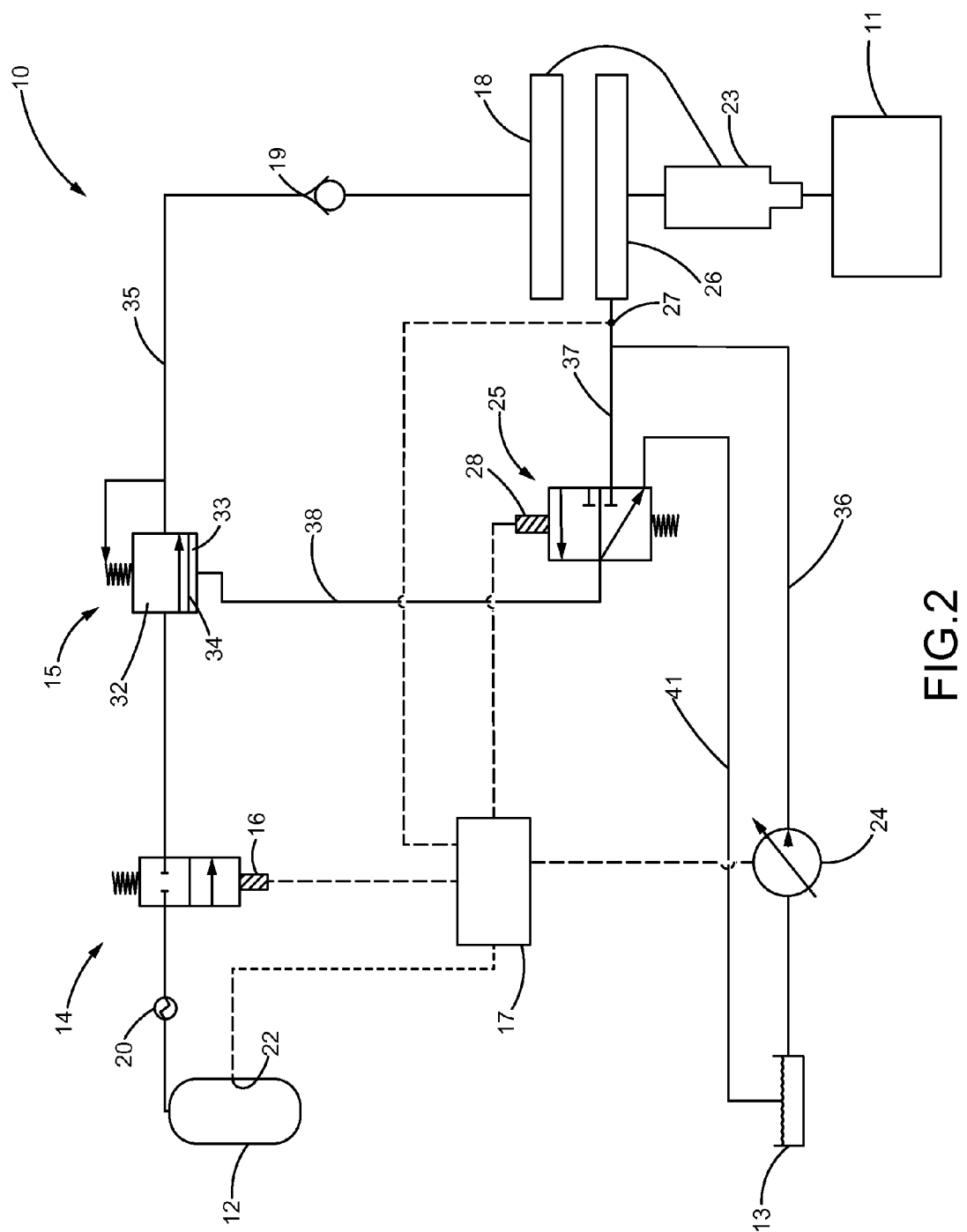
FIG. 2 is another schematic illustration of the fuel system shown in FIG. 1, wherein the fuel system is configured to operate in a limp mode.

Referring to FIG. 1, a fuel system 10 supplies fuel to an engine 11. The fuel system 10 includes a primary fuel supply 12 and a secondary fuel supply 13. The primary fuel may be natural gas while the secondary fuel may be diesel, although other primary and secondary fuels may be employed, as will be apparent to those skilled in the art. The primary fuel supply 12 may be in communication with a primary fuel isolation valve 14. If the primary fuel is natural gas, the natural gas may be vaporized through a heat exchanger 20 before flowing through the primary fuel isolation valve 14. As shown in FIGS. 1 and 2, the primary fuel isolation valve 14 may be a normally-closed directional control valve with two ports and two finite positions. However, other types of valves may be used for the primary fuel isolation valve 14, as will be apparent to those skilled in the art. In the position shown in FIG. 1 the primary fuel isolation valve 14 has been shifted to an open position thereby providing communication between the primary fuel supply 12 and the pressure regulator 15. The primary fuel isolation valve 14 may include a solenoid 16 that may be linked to a controller 17. The controller 17 may be configured to send a signal to the solenoid 16 to shift the primary fuel isolation valve 14 to the open position as shown in FIG. 1. The open position of the primary fuel isolation valve 14 as shown in FIG. 1 is a normal operating position as the primary fuel supply 12 is in communication with a primary fuel rail 18 by way of the primary fuel isolation valve 14, the pressure regulator 15 and the check valve 19. The primary fuel supply 12 may also be equipped with or in communication with a primary pressure sensor 22. While the primary pressure sensor 22 is located in the primary fuel supply 12 in FIGS. 1 and 2, the primary pressure sensor 22 may be located downstream of the primary fuel supply 12 as well. The primary pressure sensor 22 may also be linked to the controller 17. The primary fuel rail 18 may be in communication with one or more fuel injector valves 23. The one or more fuel injector valves 23 are in communication with the engine 11.

Turning to the secondary fuel, the secondary fuel supply 13 may be in communication with a secondary fuel pump 24. The secondary fuel pump 24 may be a common rail pump and the secondary fuel pump 24 may be a unidirectional variable displacement pump as indicated in FIGS. 1 and 2, although other pumps may be employed as well. The secondary fuel pump 24 may also be linked to the controller 17. The secondary fuel pump 24 may be in communication with both a secondary fuel isolation valve 25 and a secondary fuel rail 26. A secondary pressure sensor 27 may be disposed downstream of the secondary fuel pump 24 and the secondary pressure sensor 27 may also be linked to the controller 17. As shown in FIGS. 1 and 2, the secondary fuel isolation valve 25 may be a normally closed directional control valve with three ports and two finite positions, although other types of valves may be employed, as will be apparent to those skilled in the art. The secondary fuel isolation valve 25 may be solenoid-activated and may include a solenoid 28 that may also be linked to the controller 17. In the position shown in FIG. 1, the solenoid 28 has received a command from the controller 17 to shift the secondary fuel isolation valve 25 to the open position, or to the position shown in FIG. 1, where the secondary fuel pump 24 is in communication with both the secondary fuel rail 26 and the pressure regulator 15 by way of the secondary fuel isolation valve 25. While FIGS. 1 and 2 illustrate the primary fuel isolation valve 14 and the secondary fuel isolation valve 25 as normally-closed valves, one skilled in the art will realize that one or both could be normally-open valves as well.

In FIG. 1, the primary fuel isolation valve 14 and the secondary fuel isolation valve 25 are in their normal operating positions, where the primary fuel isolation valve 14 provides communication between the primary fuel supply 12 and the pressure regulator 15 and the secondary fuel isolation valve 25 provides communication between the secondary fuel pump 24 and the pressure regulator 15. More specifically, the primary fuel isolation valve 14 provides communication between the primary fuel supply 12 and a primary chamber 32 of the pressure regulator 15. Further, secondary fuel from the secondary fuel supply 13 may be delivered by the secondary fuel pump 24 through the secondary fuel isolation valve 25 to a secondary chamber 33 of the pressure regulator 15. The pressure regulator 15 may also include a control member 34 that may be responsive to changes of pressure in the secondary chamber 33.

In the normal operating mode illustrated in FIG. 1, primary fuel from the primary fuel supply 12 passes through the primary fuel isolation valve 14, through the pressure regulator 15, through the check valve 19 and to the primary fuel rail 18 before being delivered to the fuel injector valve 23. Secondary fuel, on the other hand, may be delivered from the secondary fuel supply 13 by the secondary fuel pump 24 to both the secondary fuel isolation valve 25 and the secondary fuel rail 26. The secondary fuel, pressurized by the secondary fuel pump 24, may be delivered to the secondary chamber 33 of the pressure regulator 15 by way of the open secondary fuel isolation valve 25 for purposes of regulating the pressure of the primary fuel in the conduit 35, which connects the pressure regulator 15 to the primary fuel rail 18. Further, in FIG. 1, the secondary fuel pump 24 also delivers secondary fuel to the secondary fuel rail 26 for use as pilot fuel. In FIG. 1, in the normal operating mode, the controller 17 sends one or more commands to the secondary fuel pump 24 to deliver secondary fuel to the conduit 36 at a specific normal operating pressure or a desired normal operating pressure range. Typically, the normal operating pressure for the secondary fuel, which may be diesel, may be about 30 MPa, although the normal operating pressures for different dual-fuel systems may vary. Thus, in one example, in the normal operating mode for the fuel system 10 as illustrated in FIG. 1, the secondary fuel pump 24 delivers secondary fuel from the secondary fuel supply 13 to downstream components such as the conduit 36, the conduit 37, the secondary fuel rail 26, and the conduit 38 and the secondary chamber 33 of the pressure regulator 15 at a normal operating pressure of about 30 MPa.

However, in the event the supply of primary fuel in the primary fuel supply 12 becomes depleted or otherwise loses pressure, the fuel system 10 operates in a limp mode as illustrated in FIG. 2. Turning to FIG. 2, the controller 17 has sent commands to the primary fuel isolation valve 14 to shift and/or maintain the primary fuel isolation valve 14 in the closed position thereby isolating the primary fuel supply 12 from the pressure regulator 15. The primary fuel isolation valve 14 may be optional because, as shown in FIG. 2, the controller 17 has sent a command to the secondary fuel isolation valve 25 to shift and/or maintain the secondary fuel isolation valve 25 in the closed position thereby isolating the secondary fuel pump 24 from the secondary chamber 33 of the pressure regulator 15. With no pressurized secondary fuel being delivered to the secondary chamber 33 of the pressure regulator 15, the pressure regulator 15 shuts off communication between the primary fuel supply 12 and the conduit 35. Thus, as one skilled in the art will appreciate, the pressure regulator 15 may be used to shut off flow of primary fuel to the conduit 35 when the flow of secondary fuel to the secondary chamber 33 may also be shut off. Further, in the position shown in FIG. 2, the secondary fuel isolation valve 25 provides a drain from the secondary chamber 33 through the conduit 38 to the conduit 41 and back to the secondary fuel supply 13. In the limp mode illustrated in FIG. 2, secondary fuel may be delivered from the secondary fuel supply 13 by the secondary fuel pump 24 to the conduit 36 and to the secondary fuel rail 26. Little or no primary fuel is delivered to the conduit 35 and the primary fuel rail 18 during the limp mode illustrated in FIG. 2 and accordingly, FIG. 2 reflects conditions where the engine 11 is running or combusting secondary fuel only. For diesel/natural gas systems, the limp mode may also be referred to as a run-on diesel (ROD) mode or a diesel-only mode (DOM).

When operating in a limp mode, unless the pressure of the secondary fuel is substantially increased above the normal operating pressure, the engine 11 can only generate a small percentage of the normal power output of the engine 11. To increase the power output of the engine 11 when running only on the secondary fuel, the controller 17 sends one or more commands to the secondary fuel pump 24 to increase the pressure of the secondary fuel in the conduit 36 that is delivered to the secondary fuel rail 26 to a secondary fuel-only operating pressure, which may be substantially higher than the normal operating pressure of 30 MPa. For example, in a fuel system 10 that employs natural gas as the primary fuel and diesel as the pilot fuel, a preferred diesel pressure in a limp mode may be as high as 100 MPa. Because such a high pressure could damage the pressure regulator 15, the controller 17 has also sent one or more commands to the solenoid 28 of the secondary fuel isolation valve 25 to shift or maintain the secondary fuel isolation valve 25 in the closed position shown in FIG. 2. In the position shown in FIG. 2, the secondary chamber 33 of the pressure regulator 15 is isolated from the pressurized secondary fuel in the conduit 36 and/or in the secondary fuel rail 26. Thus, the pressure regulator 15 is not subjected to the substantial force imbalances between secondary fuel at the normal operating pressure and at the limp mode operating pressure. By not subjecting the pressure regulator 15 to high-pressure secondary fuel, the pressure regulator 15 will last longer, require less maintenance and have a reduced failure rate.

Figure 3:
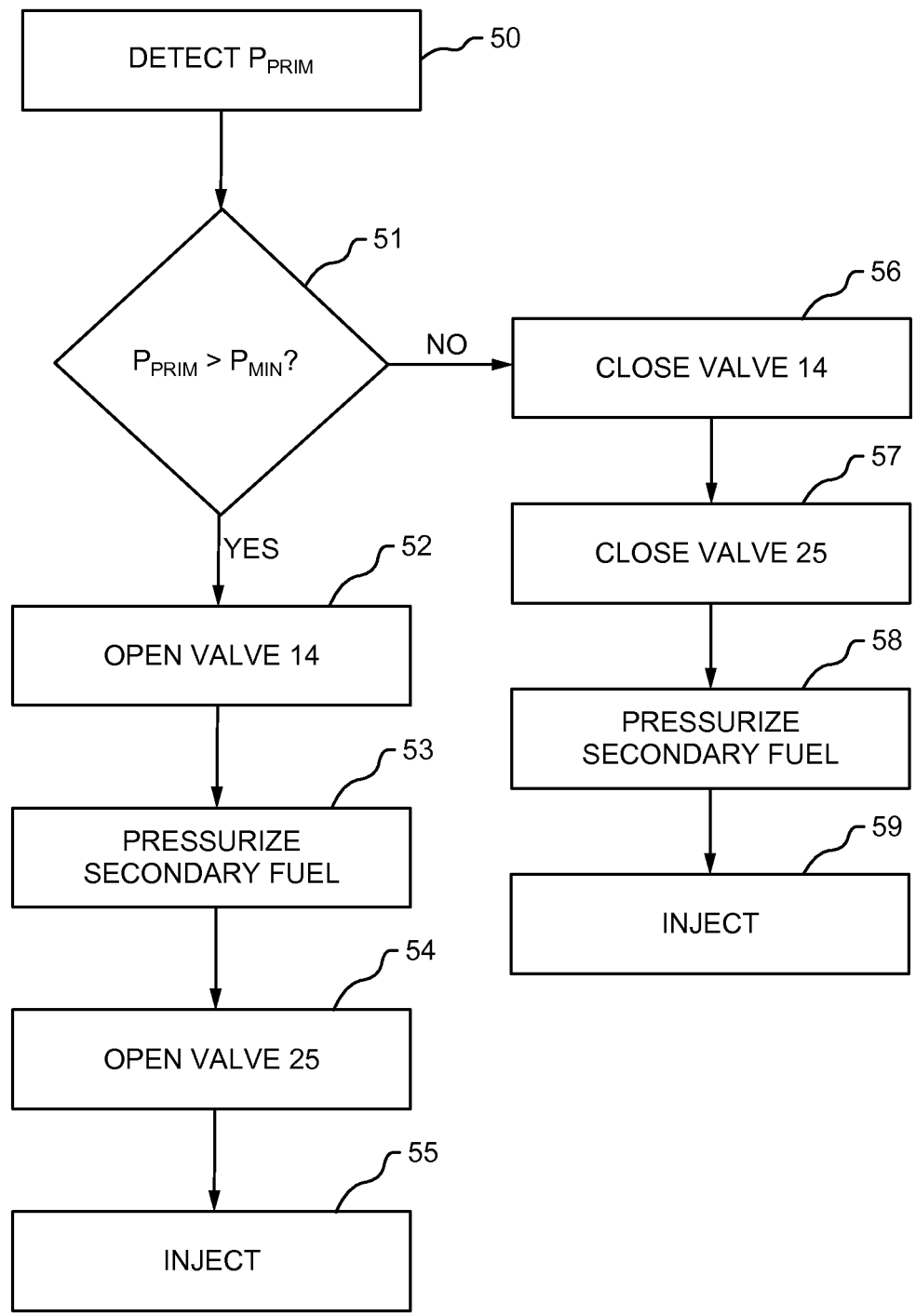
FIG. 3 is a flow chart of a method for operating the fuel system of FIGS. 1 and 2 in both the normal operating and limp modes.

A method for isolating high-pressure secondary fuel such as high-pressure diesel in an HPDI fuel system is illustrated in FIG. 3. At step 50, the controller receives a pressure signal from the primary pressure sensor 22 and, at step 51, the controller compares the signal received from the primary pressure sensor 22 against a predetermined minimum operating pressure. If the pressure of the primary fuel ($P_{PRIM}$) is greater than the minimum operating pressure for the primary fuel ($P_{MIN}$), then the controller 17 shifts or maintains the primary fuel isolation valve 14 in an open position at step 52.

The controller 17 also sends a command to the secondary fuel pump 24 at step 53 to pressurize the secondary fuel from the secondary fuel supply 13 to a normal operating pressure ($P_{OP}$) of about 30 MPa. At step 54, the controller 17 sends a signal to the solenoid 28 to open the secondary fuel isolation valve 25. Subsequently, an inject command can be sent to the fuel injector valve 23 at step 55. Returning to step 51, if the pressure of the primary fuel ($P_{PRIM}$) is not greater than the minimum operating pressure required for an injection of the primary fuel ($P_{MIN}$), the controller 17 sends a signal to the solenoid 16 to close the primary fuel isolation valve 14 at step 56 and further sends a signal to the solenoid 28 to close the secondary fuel isolation valve 25 at step 57. The controller 17 may then send a signal to the secondary fuel pump 24 to pressurize the secondary fuel at step 58 to an appropriate limp mode pressure ($P_{LIMP}$) of about 100 MPa, or a pressure substantially higher than a normal operating pressure of 30 MPa. Subsequently, the controller 17 may send an inject command to the fuel injector valve 23 at step 59.

INDUSTRIAL APPLICABILITY

The fuel system 10 and method described above enhances the capability of the fuel system 10 to operate in a limp mode. Specifically, the fuel system 10 can increase the pressure of the secondary fuel to a pressure that may be substantially greater than the normal operating pressure of about 30 MPa. Further, the fuel system 10 and the described method can accomplish this without exposing the pressure regulator 15 to the higher pressure of the secondary fuel in the limp mode. In essence, the secondary fuel isolation valve 25 acts to protect the pressure regulator 15 from the high pressures needed to effectively run the engine 11 on the secondary fuel only. For example, in a fuel system 10 that is an HPDI system, where natural gas is provided as the primary fuel and diesel is provided as the secondary fuel, a normal operating pressure when injecting both natural gas and diesel may be about 30 MPa. However, to effectively run the engine 11 in a limp mode on diesel only, the injection pressure of the diesel may preferably be about 100 MPa, or a pressure that is substantially higher than the normal operating pressure. Such a high pressure can cause the pressure regulator 15 to malfunction or possibly fail. By employing the secondary fuel isolation valve 25, the pressure regulator 15 is protected from high-pressure secondary fuel when the fuel system 10 is operating in the limp mode. Accordingly, the fuel system 10 and method disclosed herein improve the performance of the engine 11 in the limp mode and enhances the reliability and useful lifespan of the pressure regulator 15.

While only certain embodiments have been set forth, alternatives and modifications will be apparent from the above description to those skilled in the art. These and other alternatives are considered equivalents and within the spirit and scope of this disclosure and the appended claims.

What is claimed:

1. A fuel system for an internal combustion engine, the fuel system comprising:
    a primary fuel supply in communication with a primary chamber of a pressure regulator, the primary chamber of the pressure regulator in communication with a primary fuel rail, the primary fuel supply in communication with a primary pressure sensor, the primary pressure sensor linked to a controller,
    a secondary fuel supply in communication with a secondary fuel pump, the secondary fuel pump in communication with a secondary fuel isolation valve and a secondary fuel rail, the secondary fuel pump linked to the controller, the secondary fuel pump in communication with a secondary pressure sensor disposed downstream of the secondary fuel pump,
    the secondary fuel isolation valve in selective communication with a secondary chamber of the pressure regulator, the secondary fuel isolation valve linked to the controller,
    the secondary fuel isolation valve having a normal operating position where the secondary fuel pump is in communication with the secondary chamber through the secondary fuel isolation valve, the secondary fuel isolation valve also having a limp mode position where the secondary fuel isolation valve isolates the secondary fuel pump from the secondary chamber,
    wherein the controller is configured to command the secondary fuel pump to deliver secondary fuel to the secondary fuel isolation valve and the secondary fuel rail at a first pressure and to shift the secondary fuel isolation valve to its normal operating position when the primary pressure sensor detects that a pressure of the primary fuel supply is above a predetermined minimum operating pressure, and
    wherein the controller is configured to command the secondary fuel pump to deliver secondary fuel to the secondary fuel rail at a second pressure and to shift the secondary fuel isolation valve to its limp mode position when the primary pressure sensor detects that the pressure of the primary fuel supply is below the predetermined minimum operating pressure,
    the second pressure of the secondary fuel rail being greater than the first pressure.

2. The fuel system of claim 1 further including a primary fuel isolation valve disposed between and in communication with both the primary fuel supply and the pressure regulator, the primary fuel isolation valve having a normal operating position where the primary fuel isolation valve provides communication between the primary fuel supply and the primary chamber of the pressure regulator and a limp mode position where the primary fuel isolation valve isolates the primary fuel supply from the pressure regulator.

3. The fuel system of claim 2 wherein the primary fuel isolation valve is linked to the controller.

4. The fuel system of claim 1 wherein the pressure regulator is a dome loaded regulator.

5. The fuel system of claim 1 wherein the primary fuel is natural gas.

6. The fuel system of claim 1 wherein the secondary fuel is diesel.

7. The fuel system of claim 1 wherein first pressure is about 30 MPa.

8. The fuel system of claim 1 wherein the second pressure greater than the first pressure.

9. The fuel system of claim 1 wherein the first pressure is about 30 MPa and the second pressure ranges from greater than 40 to about 100 MPa.

10. A high-pressure direct-injection (HPDI) fuel system comprising:
    a primary fuel supply in communication with a primary chamber of a pressure regulator, the primary chamber of the pressure regulator in communication with a primary fuel rail, the primary fuel supply in communication with a primary pressure sensor, the primary pressure sensor linked to a controller, secondary fuel supply in communication with a secondary fuel pump, the secondary fuel pump in communication with a secondary fuel isolation valve and a secondary fuel rail, the secondary fuel isolation valve in selective communication with a secondary chamber of the pressure regulator, the secondary chamber isolated from the primary chamber, the pressure regulator including a control member movable in response to changes in pressure in the secondary chamber, the secondary fuel isolation valve and the secondary fuel pump linked to the controller, wherein the controller is configured to maintain the secondary fuel isolation valve in a normal operating position where the secondary fuel isolation valve provides communication between the secondary fuel pump and the secondary chamber and the controller is further configured to command the secondary fuel pump to deliver secondary fuel to the secondary fuel isolation valve and the secondary fuel rail at a first pressure when the pressure of the primary fuel supply is above a predetermined minimum operating pressure, and wherein the controller is configured to maintain the secondary fuel isolation valve in a limp mode position where the secondary fuel isolation valve isolates the secondary fuel pump from the secondary chamber and the controller is further configured to command the secondary fuel pump to deliver secondary fuel to the secondary fuel rail at a second pressure that exceeds the first pressure when the pressure of the primary fuel supply falls below the predetermined minimum operating pressure.

11. The fuel system of claim 10 further including a primary fuel isolation valve disposed between and in communication with both the primary fuel supply and the pressure regulator, the primary fuel isolation valve having a normal operating position where the primary fuel isolation valve provides communication between the primary fuel supply and the pressure regulator and a limp mode position where the primary fuel isolation valve isolates the primary fuel supply from the pressure regulator.

12. The fuel system of claim 11 wherein the primary fuel isolation valve is linked to the controller.

13. The fuel system of claim 10 wherein the pressure regulator is a dome loaded regulator.

14. The fuel system of claim 10 wherein the primary fuel is natural gas.

15. The fuel system of claim 10 wherein the secondary fuel is diesel.

16. A method for isolating high-pressure diesel in a high-pressure direct-injection fuel system, the method comprising:

providing a natural gas supply, providing a diesel supply and connecting the diesel supply to a pump, sensing the pressure of the natural gas supply, if the pressure of the natural gas supply is above a predetermined minimum operating pressure, providing communication between the natural gas supply and a first chamber of a pressure regulator, operating the pump to output diesel at a desired normal operating pressure, and providing communication between the pump and a secondary chamber of the pressure regulator, if the pressure of the natural gas supply is below the predetermined minimum operating pressure, operating the pump to output diesel at a desired limp mode pressure that is greater than the normal operating pressure and isolating the pump from the secondary chamber of the pressure regulator.

17. The method of claim 16 wherein the pressure regulator is a dome loaded regulator.

18. The method of claim 16 further including isolating the natural gas supply from the first chamber of the pressure regulator if the pressure of the natural gas supply is below the predetermined minimum operating pressure.

19. The method of claim 16 wherein the predetermined minimum operating pressure is about 30 MPa.

20. The method of claim 16 wherein the desired limp mode pressure is about 100 MPa.

* * * * *